Dec. 22, 1931. J. A. FERGUSON 1,837,706
METALLIC STRUCTURAL FRAMEWORK
Filed Jan. 10, 1928   3 Sheets-Sheet 1
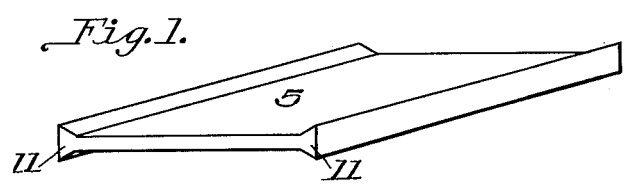
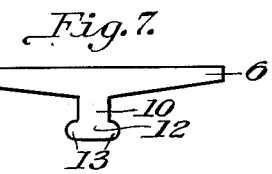
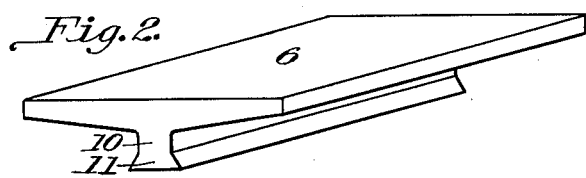
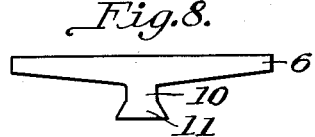
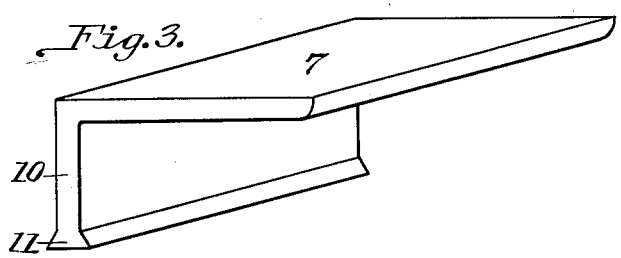
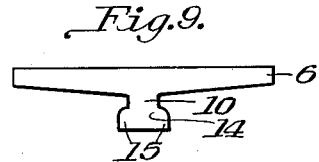
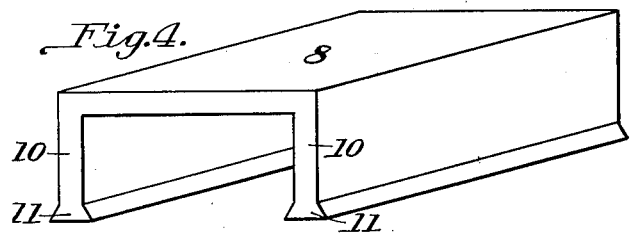
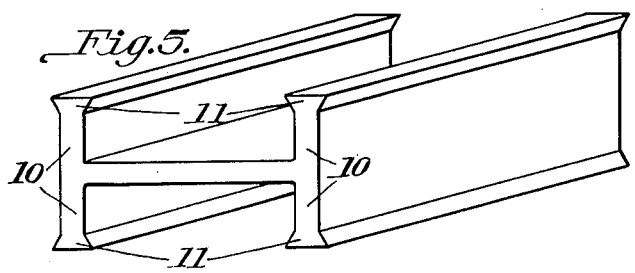
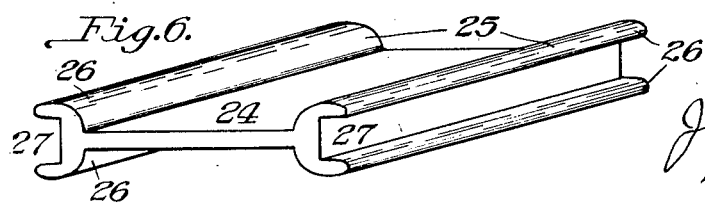
INVENTOR
John A. Ferguson
by W. F. Doolittle
Attorney Dec. 22, 1931.  J. A. FERGUSON  1,837,706
METALLIC STRUCTURAL FRAMEWORK
Filed Jan. 10, 1928   3 Sheets-Sheet 2

INVENTOR
John A. Ferguson
by W. F. Dooliale
Attorney

Dec. 22, 1931.  J. A. FERGUSON  1,837,706
METALLIC STRUCTURAL FRAMEWORK
Filed Jan. 10, 1928   3 Sheets-Sheet 3
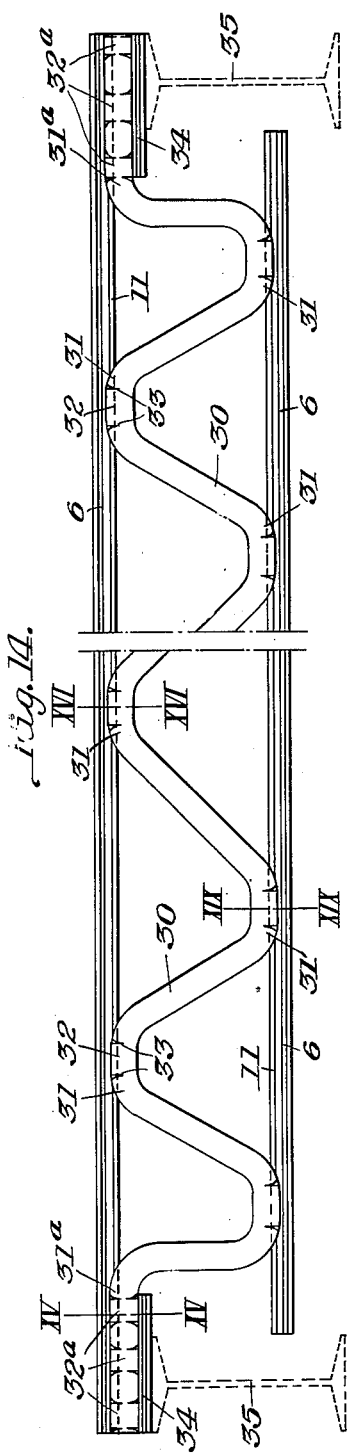
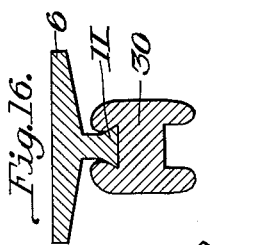
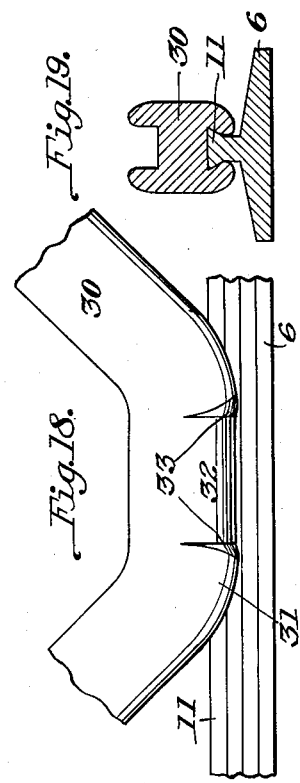
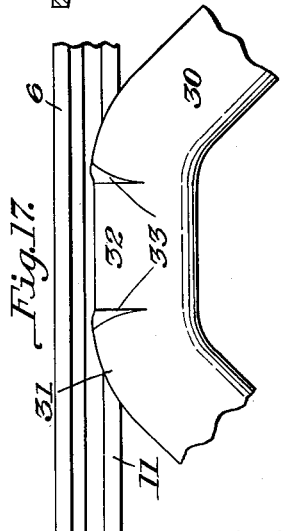
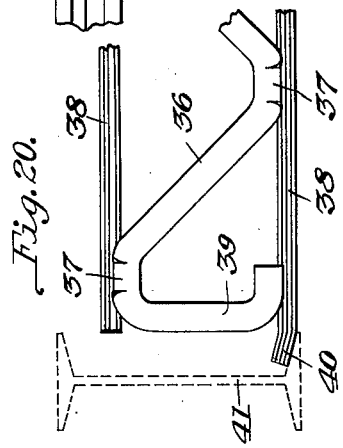
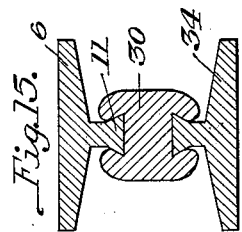
INVENTOR
John A. Ferguson
by W. G. Doolittle
Attorney Patented Dec. 22, 1931

1,837,706

UNITED STATES PATENT OFFICE

JOHN A. FERGUSON, OF PITTSBURGH, PENNSYLVANIA, ASSIGNOR OF ONE-THIRD TO THOMAS B. STURGES, OF PITTSBURGH, PENNSYLVANIA

METALLIC STRUCTURAL FRAMEWORK

Application filed January 10, 1928. Serial No. 245,708.

My invention relates to metallic structural frameworks, and more particularly to new and improved structural framework shapes per se and to units or members designed to enter into the construction of the framework. My invention enables the employment of units of the character specified, made up of a plurality of specially shaped members or parts capable of being rolled in a suitable mill and fabricated into the said structural shape units for ready assembly to form or to enter into the construction of a metallic structural frame.

Heretofore, it has been necessary to secure the members of a metallic structural framework together by punching or drilling holes in the structural shapes, after such shapes are assembled into the framework or desired relation, passing rivets or bolts through such holes, and then driving or turning them up tight. This method, due to the necessity of providing the multiplicity of holes through the metal of the structural shapes and consequent removal of a certain amount of the metal thereof tends to unduly weaken the shapes. The aforesaid present method is also very expensive since considerably heavier shapes must be used for the members and the framework generally to compensate for such weakening through the removal of metal.

Among the objects of the present invention, are to provide a new and improved structural shape unit including a plurality of members or parts assembled and connected together; to provide a unit of the character stated made up of rolled members and characterized in that the parts entering into a joist structure or a column structure, for example, are united without punching and riveting, and each co-acts with the other in forming a part of a mutual joint.

Additional objects and advantages will be pointed out or become apparent from a consideration of embodiments as hereinafter described, and as shown by the acompanying drawings.

In the drawings, which illustrate applications of my invention:

Figs. 1 to 6, inclusive, are perspective views showing various forms of structural shapes embodying my invention;

Figs. 7 to 9, inclusive, are end views of members particularly showing modified forms of elements formed integral with the member proper, and designed to form part of the mutual joint or means for uniting co-acting members;

Fig. 14 is a side elevational view of a structural joist unit embodying my invention;

Fig. 15 is an enlarged sectional view taken on line XV—XV of Fig. 14;

Fig. 16 is an enlarged sectional view on line XVI—XVI of Fig. 14;

Fig. 17 is an enlarged elevational view, particularly showing the connection at the top chord of the joint;

Fig. 18 is a similar view, showing the connection at the bottom chord;

Fig. 19 is an enlarged sectional view on line XIX—XIX of Fig. 14; and

Fig. 20 is a detail elevation of a modified form of support for the structural joist unit.

Figure 10:
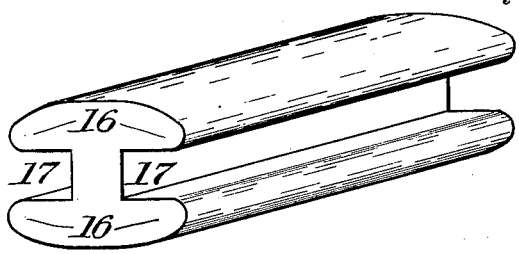
Fig. 10 is a perspective view of a portion of a form of locking member employed.

In all of the forms illustrated in the accompanying drawings, the structural shape is usually of steel rolled into shape and the body thereof has one or more enlarged or expanded integrally formed heads or joint elements thereon. Except in the case of the plates of Figs. 1, 12 and 13, each shape has one or more of the said heads or joint members formed on the limbs of tongues which constitute usual parts thereof. Said heads constitute parts of joints or enter into combinations of means whereby the shapes may be secured together by the employment of a co-acting flanged locking or clamping bar member, without the necessity of punching or perforating the structural shapes and subsequently bolting or riveting the shapes together, as heretofore. Said shapes are rigidly secured together against displacement relatively to each other and in such manner that all of the forces generated within the framework will be transferred from one shape to the other, without the slightest relative displacement or slipping of the parts, and without exceeding the accepted engineering unit stresses or the factors of safety based on ultimate strength and carrying capacity of the complete structural framework.

As shown in Figs. 1 to 5 inclusive, the structural frame members may partake of various standard or other shapes, according to conditions. For example, as shown in Fig. 1, the frame member is a plate whose body is designated 5. In Fig. 2, a T-shaped body 6 is illustrated. In Fig. 3, an angle or L-shaped body 7 is shown. While one of the angles or walls of the body 7 is wider than the other, it may be of the same width, since the angles may be in any relative proportions preferred. The body 8 in Fig. 4 is of U-shape or channel form; while in Fig. 5, the body is an I-beam. In each of the forms of Figs. 2 to 5, one or more limbs or tongues 10 form a usual part or parts of the body.

At the longitudinal edges of the body 5 of the form of Fig. 1, and at the free longitudinal edges of each of the limbs or tongues 10, Figs. 2 to 5, a suitable joint element or head 11 is provided. Such heads form integral enlargements of the bodies or limbs, and extend laterally beyond the side faces thereof. As shown in Figs. 1 to 5 and in Fig. 8, which latter is an end elevation of the form of member shown in Fig. 2, the joint element or head may be wedge-shaped or dovetailed. Strict adherence to such shape of the head is not necessary, since an equivalent form may be employed, as shown, for example, in Figs. 7 and 9. Each form of the head, however, is preferably generally T-shaped. In Fig. 7, the head or joint element is designated 12 and its laterally projecting parts 13 are semi-circular or rounded. In Fig. 9, the head 14 has its laterally projecting parts 15 rounded at the inner corner and squared at the other corner.

Figure 11:
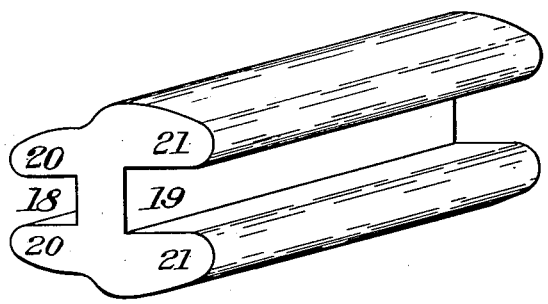
Fig. 11 is a similar view, showing a modified form of the said locking member.

In connection with the aforesaid representative or like structural shapes, I provide a rolled steel or equivalent connector or lock bar member, as in Figs. 10 and 11. Each of said members is generally H-shaped in cross section. In the form of Fig. 10, there are separated flanged portions 16 providing spaces or grooves 17 between them for reception of a head 11, 12 or 14 of an associated joint element.

In the form of Fig. 11, the structure differs from that of Fig. 10 in that the grooves 18 and 19, which are adapted to receive the joint elements or heads, are unlike in width. The flanges forming the groove 18 are designated 20, and those forming the groove 19 are designated 21. Said flanges 21 are preferably heavier and thicker than the flanges 20, since they are adapted to secure plates in the grooves 19 which are thicker than those adapted to be secured in the groove 18.

Figure 12:
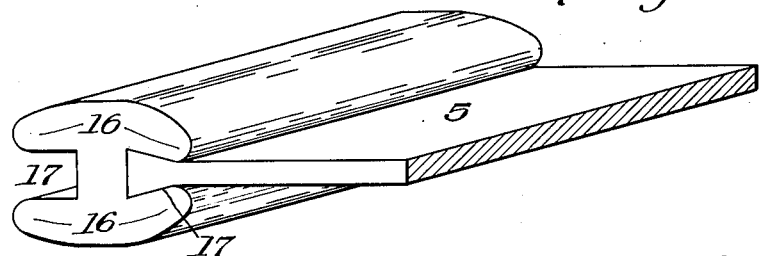
Fig. 12 is a perspective view of the member of the form of Fig. 10, showing the manner of securing it to a structural shape member of my invention.

In Fig. 12, the form of lock bar detailed in Fig. 10 is shown in conjunction with a fragment of the structural shape or plate 5 of Fig. 1, to which similar reference characters have been applied. The head 11 in such Fig. 12 is shown disposed and secured in one of the grooves 17, the locking bar and said shape 5 being rigidly secured together against relative displacement in all directions by clamping, upsetting or compressing as by rolling the flanges 16 cold into intimate contact with the head 11, resulting in deforming the metal of the flanges 16 and the head 11 both longitudinally and transversely or in planes at an angle to each other.

Figure 13:
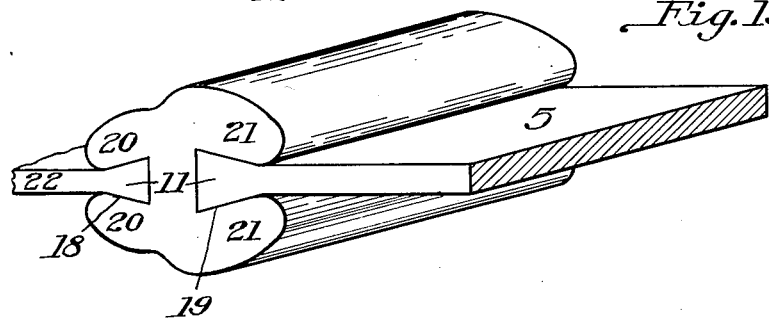
Fig. 13 is a view similar to Fig. 12, embodying the form of the member shown by Fig. 11, shown in connection with two members of my invention, said members being of different thicknesses.

In Fig. 13, two structural plates are secured rigidly together by the locking bar of Fig. 11. One of such shapes is similar to that at 5 in Figs. 1 and 12, and the other shape, which is designated 22, is also similar in configuration but of different size. The heads of said shapes 5 and 22 in Fig. 13 occupy the grooves 18 and 19 and are rigidly secured therein by rolling or otherwise deforming the flanges 20 and 21 and adjacent portions of the locking bar transversely and longitudinally, similarly to the action and resulting structure described with respect to flanges 16, to thereby rigidly secure the structural shapes and locking bar together.

Reverting to Fig. 6, a metallic body is shown at 24, which may partake of the nature of both a structural shape and a locking bar, according to its use. It comprises a plate having a head 25 at each longitudinal edge. Each head 25 consists of outwardly extending flanges 26 which provide spaces 27 between them, adapted to receive and be secured to any of the joint elements or heads, such as 11, 12 or 14, forming a structural unit therewith.

In all forms of the invention, after assembling the shapes and locking bars, the structure is rolled, clamped or compressed, so that the connecting bar will surround and tightly clamp the elements of the members with such force as to partially deform the metal of the said element in a plurality of directions, that is, transversely and longitudinally.

An example of the utilization of the principles of my invention in a unit forming a joist is shown in Figs. 14 to 19 inclusive. In that form, two of the structural frame members 6, as detailed in Figs. 2 and 8, are used to form upper and lower chords, and the same reference characters have been applied thereto. The connecting or locking bar in this instance is designated 30 and in cross section may be of the form illustrated in Fig. 10. Unlike the straight bar of Fig. 10, the bar 30 is of zig-zag form, so as to engage the structural members 6 alternately as at 31 and 31a, as best shown in Fig. 14.

The said portions 31 and 31a of the locking bar 30 are rolled, clamped, or pressed while cold, so that the flanges at such portions will surround and tightly clamp or bind with the heads 11 with such force and security as to partially deform the metal of said heads and said portions 31 and 31a both longitudinally and transversely. Such rolling or clamping operation will form a slight depression in the locking bar at each portion 31 and a plurality of such depressions in portion 31a, as at 32 and 32a, and thus provide shoulders or abutments 33 at the terminals of the depressed portions, which abutments assist the joint in resisting the forces acting thereon and the locking bar to transversely bite or bind with the heads 11, the metal of the walls of the grooves of the locking bar being brought into close contact with the said depressions between the shoulders 33, thereby forming a strong and intimate contact between the parts. The depressions 32a may be spaced apart.

At each end, the upper bar 6 and locking bar 30 extend outwardly beyond the lower bar 6 adjacent the portion 31a where the plurality of depressions 32a are formed, so as to specifically secure the terminals of the upper bar and the locking bar 30 together. Also, depressions 33 are formed in line with the terminal depressions 32 at the opposite side of the locking bar, and serve to secure relatively short structural form members or end bearing plates 34, of the same cross sectional form of the shapes 6, to the locking bar in the same manner that the locking bar is secured to the shapes 6. Such members 34 may rest or be mounted directly on supporting beams 35 in a building framework or structure.

Another modified form of joist unit is shown fragmentarily in Fig. 20, where a connecting bar 36 has depressions 37 conforming to those at 32 and in a similar manner secures same to upper and lower frame members 38, which may be similar to member 6. Terminally, locking bar 36 has a transverse hook-shaped portion 39 bridging the bars 38 and engaging each of them to afford maximum bracing strength. The lower bar 38 is longer than the upper bar 38 to provide a terminal 40, which may be slightly inclined and rest or be mounted on the lower flange of a supporting I-beam 41 in a building or structural framework.

Various changes may be resorted to, provided they fall within the spirit and scope of the invention.

I claim as my invention:

1. A structural frame unit comprising spaced apart structural frame members each having T-shaped joint heads, and a locking bar alternately engaging the head of one member and then the head of the other member and having portions overlapping the heads at the zones of engagement, said bar and heads being compressed rigidly together at the zones of engagement by a single pressing operation, said zones of engagement being of a length only sufficient to transmit forces from one spaced-apart member to the other, said bar having a substantially straight terminal portion, an end bearing plate, the end bearing plate and one of the frame members engaging the opposite sides of said locking bar and having overlapped portions in rigid compressed engagement.

2. A structural frame unit comprising spaced-apart frame members each having T-shaped joint heads, a single locking bar, said bar being of H-shape in cross section with the web thereof relatively stout and the flanges relatively small, said bar at the flanges and adjacent grooves of the bar alternately engaging the head of one member and then the head of the other member and being compressed thereat into rigid engagement, such zones of engagement at the respective members being spaced apart and of insufficient length to function as chord members but of sufficient length to transmit forces from one chord member to the other member, one of said members being longer than the other, end bearing plates having portions in rigid compressed relation with the flanges of said bar at the opposite side to said longer member, the terminals of said bar engaging the longer member and being free of the shorter member.

In testimony whereof I affix my signature.

JOHN A. FERGUSON.